United States Patent
Yamazaki et al.

[19]

[11] Patent Number: 6,074,163
[45] Date of Patent: Jun. 13, 2000

[54] APPARATUS FOR TAKING AWAY PLATE AND METHOD FOR TAKING AWAY PLATE

[75] Inventors: Fumio Yamazaki, Shijyonawate; Tsukasa Hashimoto, Higashi-Osaka, both of Japan

[73] Assignee: Matsushita Electric Industrial Co., Ltd., Japan

[21] Appl. No.: 09/137,512

[22] Filed: Aug. 20, 1998

[30] Foreign Application Priority Data

Aug. 27, 1997 [JP] Japan ................................. 9-230588

[51] Int. Cl.[7] ................................................ B65G 59/00
[52] U.S. Cl. ..................... 414/795.5; 271/97; 294/119.1; 414/801
[58] Field of Search ............................ 414/795.5, 796.9, 414/801; 271/97, 98; 294/119.1

[56] References Cited

U.S. PATENT DOCUMENTS

| | | | |
|---|---|---|---|
| 3,845,950 | 11/1974 | Kuzniak ................................. | 271/194 |
| 4,822,091 | 4/1989 | Vermeer et al. ...................... | 294/119.1 |
| 5,127,695 | 7/1992 | Zoeten ................................. | 294/119.1 |
| 5,199,845 | 4/1993 | Hirashima et al. ................... | 414/796.9 |
| 5,338,150 | 8/1994 | Focke et al. ......................... | 414/796.9 |
| 5,417,543 | 5/1995 | Focke et al. ......................... | 414/796.9 |
| 5,746,571 | 5/1998 | Dietschi et al. ...................... | 271/98 |

FOREIGN PATENT DOCUMENTS

| | | | |
|---|---|---|---|
| 0 176 496 A1 | 4/1986 | European Pat. Off. . | |
| 55-52839 | 4/1980 | Japan ................................. | 414/795.5 |
| 62-244832 | 10/1987 | Japan ................................. | 414/796.9 |
| 1166-988 | 7/1985 | U.S.S.R. ............................. | 414/796.9 |

*Primary Examiner*—Douglas Hess
*Attorney, Agent, or Firm*—Parkhurst & Wendell, L.L.P.

[57] ABSTRACT

There are provided an apparatus and a method for easily removing a plate (1) having been fired from a support plate (2) on which the plate (1) is placed by a mechanical method without producing a flaw. Scooping blocks (4) are disposed in an opposed relation in the vicinity of outer peripheral edges (1a) on the longer sides of the plate (1), and a gas injection mechanism (11) for injecting a pressurized gas is provided next to the scooping block (4). After the edges of the plate (1) are floated by injecting the pressurized gas from the gas injection mechanism (11) to the outer peripheral edges (1a) of the plate (1) through pipes (12), the scooping blocks (4) are inserted under the plate (1). Thereafter, the scooping blocks (4) are moved upward, by which the plate (1) is removed from the support plate (2).

10 Claims, 9 Drawing Sheets

APPARATUS FOR TAKING AWAY PLATE AND METHOD FOR TAKING AWAY PLATE

FIELD OF THE INVENTION

The present invention relates to an apparatus for taking away a plate and a method for taking away a plate using that apparatus and, more particularly, to an apparatus for taking away a glass plate fired in a continuous firing furnace from a support plate and a method for taking away a plate using that apparatus.

BACKGROUND OF THE INVENTION

In a conventional manufacturing process for a glass plate used for a plasma display or other devices, as shown in FIG. 12, a glass plate 100 having paste for an electrode printed on the surface thereof is placed on a support plate 101 made of heat resisting glass, and the support plate 101 and the plate 100 are carried into a continuous firing furnace 102 to be subjected to heating and cooling, thereby firing the plate 100. The work for placing the plate 100 on the support plate 101 and the work for removing the plate 100 from the support plate 101 after the plate 100 has been fired are performed by hand.

However, when the fired plate 100 is removed from the support plate 101, it is difficult to peel the plate 100 off the support plate 101 because the plate 100 adheres closely to the support plate 101. Also, because the plate 100 is thin, handling is difficult and the plate 100 is sometimes broken. Further, because the plate 100 is touched by hand in the manual operation, dust sticks to the plate 100, and there is a possibility of stains produced on the plate 100.

DISCLOSURE OF THE INVENTION

The present invention was made to solve the above problems, and an object thereof is to provide an apparatus for taking away a plate and a method for taking away a plate using that apparatus, in which a fired plate can easily be removed from a support plate, on which the plate is placed, by a mechanical method without relying on manual work, dust does not stick, and stains are not produced on the plate.

The apparatus for taking away a plate in accordance with the present invention comprises support means for holding a plate, gas injection means for floating the plate above the support means by injecting gas under an edge of the plate, plate scooping means for scooping the plate by inserting the tip end thereof under the lower side of the floated plate, and drive means for removing the plate from the support means by moving the plate scooping means. By this configuration, the gas injected from the gas injection means enters between the lower surface of plate edge and the support means. Therefore, the plate edge floats from the support means, and the plate scooping means can be made to enter easily under the plate, by which the plate can be removed from the support plate.

Also, the method for taking away a plate in accordance with the present invention, which uses the apparatus for taking away a plate of the present invention, comprises the steps of floating an edge of a plate from above a support means by injecting gas from a gas injection means under the edge of the plate, supporting the lower side of the plate by the tip end of a plate scooping means, and removing the plate from the support means by moving the plate scooping means. By this method, when the gas pressurized by the gas injection means is injected to the plate edge, the gas enters between the lower surface of plate edge and the support means, so that a buoyancy produced on the plate causes the plate edge to float from above the support means. By floating the plate edge from the support means, the plate scooping means can be made to enter easily under the plate, by which the plate can be removed from the support plate.

DESCRIPTION OF THE EMBODIMENTS

An embodiment of the present invention will be described below with reference to the accompanying drawings.

Figure 1:
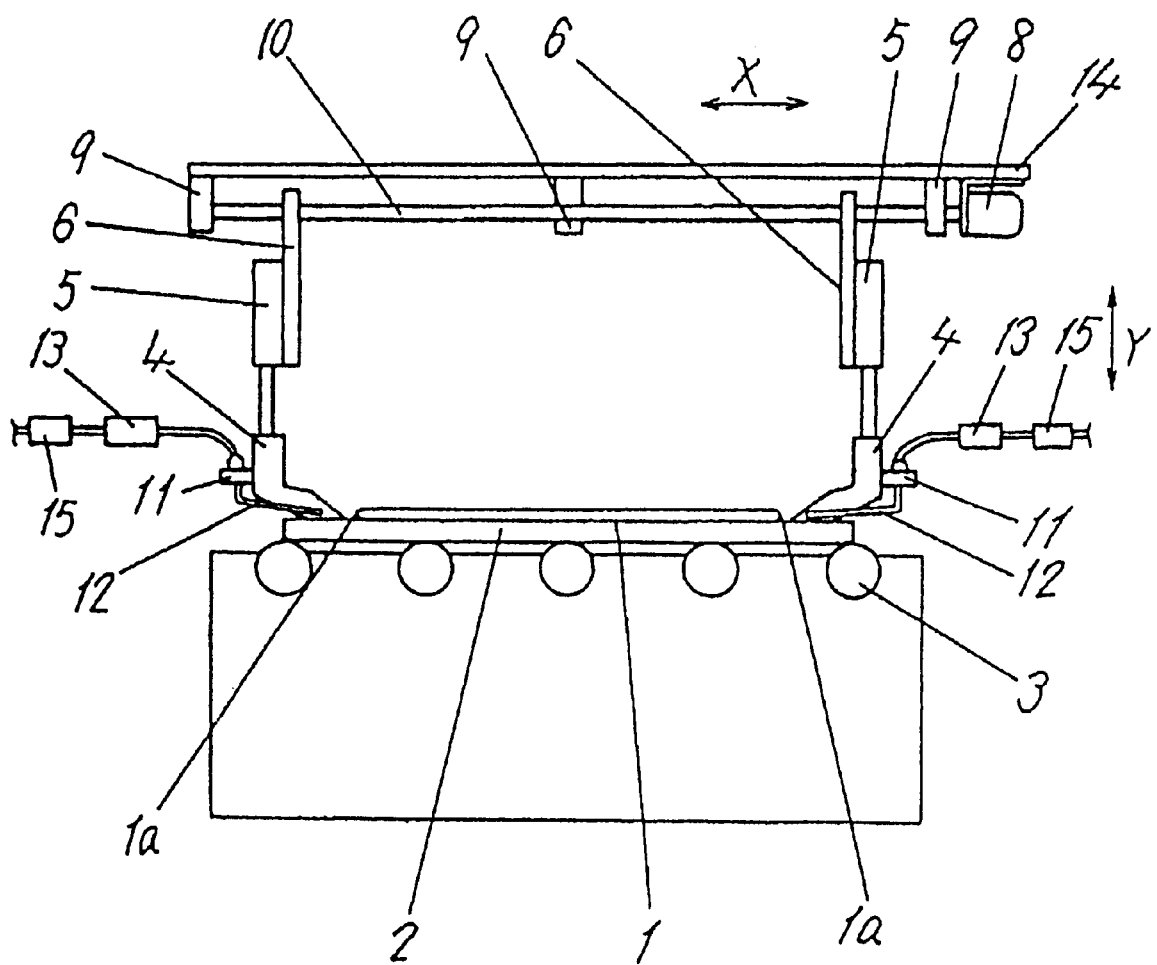
FIG. 1 is a front view of an apparatus for taking away a plate in accordance with an embodiment of the present invention.
Figure 2:
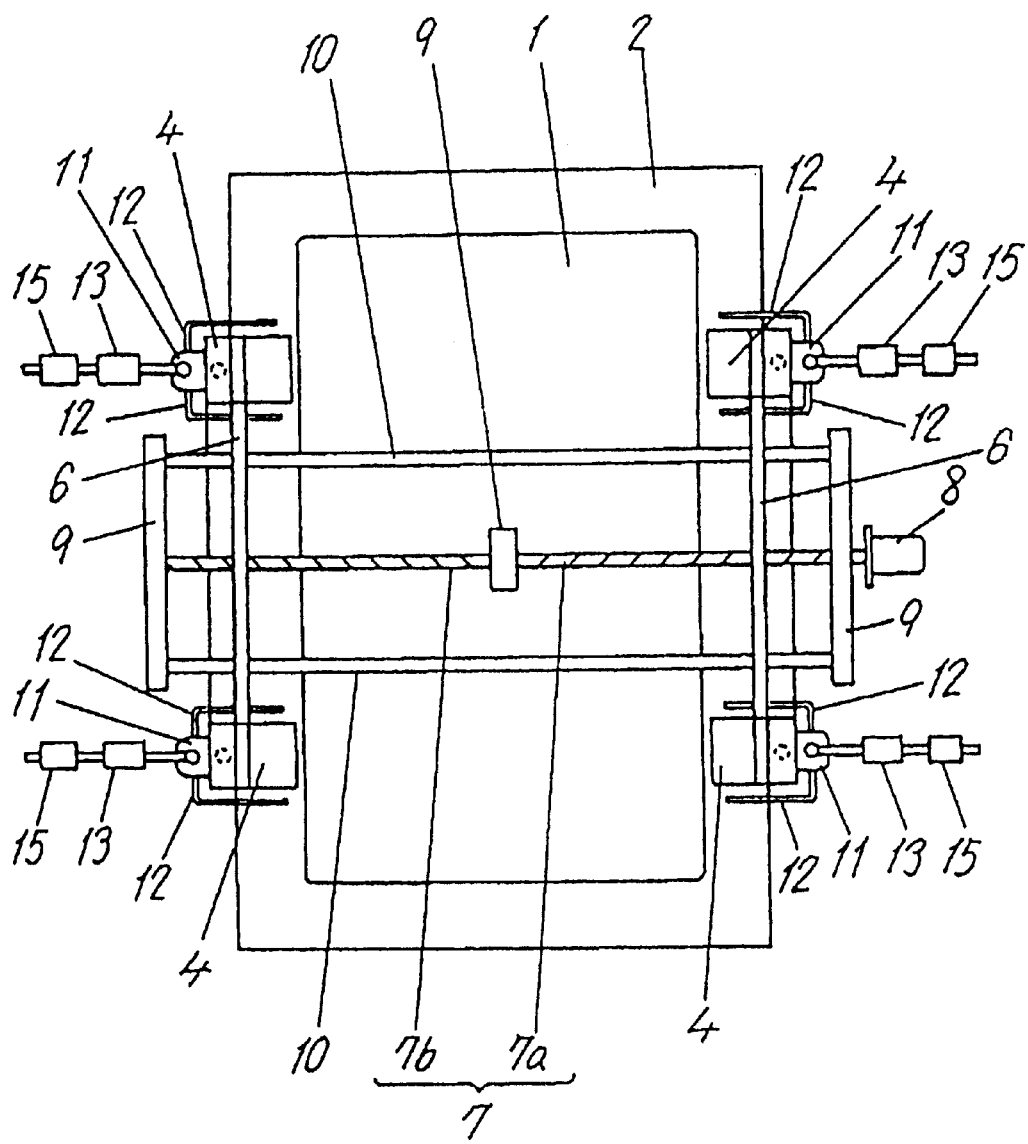
FIG. 2 is a plan view of an apparatus for taking away a plate shown in FIG. 1, in which an installation plate is omitted.
Figure 5:
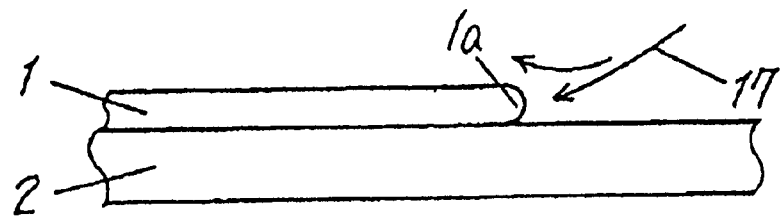
FIG. 5 is a partially enlarged view of a plate under which gas is injected.
Figure 6:
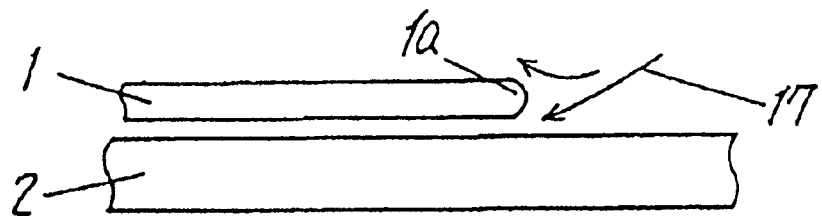
FIG. 6 is a partially enlarged view of a plate floating when gas is injected under the plate.

FIG. 1 is a front view of an apparatus for taking away a plate in accordance with the present invention, and FIG. 2 is a plan view thereof, in which an installation plate 14 is omitted. FIGS. 1 and 2 show a state in which a glass plate 1 placed on a support plate 2, which is support means, has been carried out of a continuous firing furnace by means of conveyor rollers 3 after being fired. In FIGS. 1 and 2, the plate 1 is a flat plate shaped rectangular plate, for example, with a size of 980 mm×554 mm and a thickness of 2.8 mm, and the outer peripheral edge 1a thereof has a curved cross-sectional shape which is convex toward the outside as shown in FIG. 5 or FIG. 6. The support plate 2, made of a heat resisting material, has a larger flat surface than the glass plate 1.

A scooping block 4, which is a means for scooping the plate 1, is provided in the vicinity of the outer peripheral edge 1a on the longer side of the plate 1, for example, at four places so as to be opposed to the outer peripheral edge 1a. The scooping block 4, which is made of a wear resistant metal, is supported by an air cylinder 5 fixed to a bracket 6 so as to be movable in the direction of arrow Y. The bracket 6 is movable in the direction of arrow X by a drive screw 7 (7a, 7b) supported by a bearing 9. The drive screw 7a and the drive screw 7b have threaded directions opposite to each other. Therefore, when the drive screw 7 is turned by a drive motor 8, two brackets 6 moves in the direction in which they come close to each other or move away from each other. The brackets 6 can be moved stably by guide shafts 10.

Gas injection means 11, provided together with the scooping block 4, has pipes 12 consisting of thin tubes disposed on both sides of the scooping block 4. The pipe 12 extends to the outer peripheral edge 1a of the plate 1 so as to inject high-pressure gas from the slantwise upper direction or horizontal direction with respect to the outer peripheral edge 1a of the plate 1. The injection of this high-pressure gas produces a buoyancy on the plate 1, so that it can float the plate 1 above the support plate 2. If the pipes 12 are disposed in the vicinity of the edge of the plate 1, the gas can be injected to the plate edge without a decrease in gas pressure, so that the buoyancy can be produced effectively by the gas injection.

Figure 3:
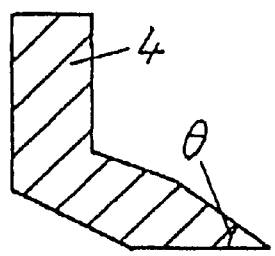
FIG. 3 is a sectional view of a plate scooping block in accordance with the present invention.

FIG. 3 is a sectional view of the scooping block 4. As shown in FIG. 3, the tip end of the scooping block 4 is formed into a wedge shape, the tip end angle θ being not larger than 45 degrees. Since the tip end of the scooping block 4 is formed into a wedge shape, the tip end of the scooping block 4 can be inserted under the plate 1 even when the plate 1 floats by a small amount from the support plate 2.

Figure 4:
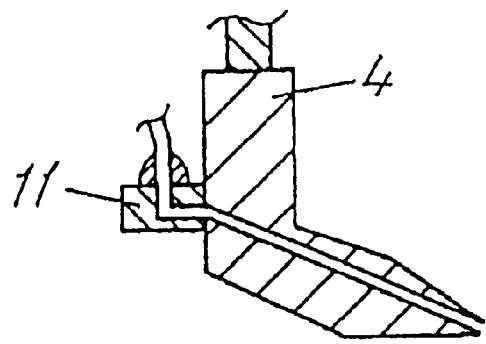
FIG. 4 is a sectional view of another plate scooping block in accordance with the present invention.

Although the gas injection means 11 is disposed on both sides of the scooping block 4 in this embodiment, it may be disposed on one side only. Alternatively, the injection pipe may be disposed within the scooping block 4 as shown in FIG. 4. Further, the gas injection means 11 may be disposed so as to be independent of the scooping block 4. The pressure of the injected gas is about 4 to 5 kg/cm$^2$, but it can be regulated by a pressure regulator 13. When the plate size is small, the injection pressure is made low, by which smooth scooping of plate can be performed without floating the plate any more than is necessary. As the injected gas, nitrogen, air or other gases are used, and the gas injection means 11 is configured so that clean gas is injected by making the gas pass through a filter 15.

The following is a description of the operation of the apparatus for taking away the plate described above.

Figure 7:
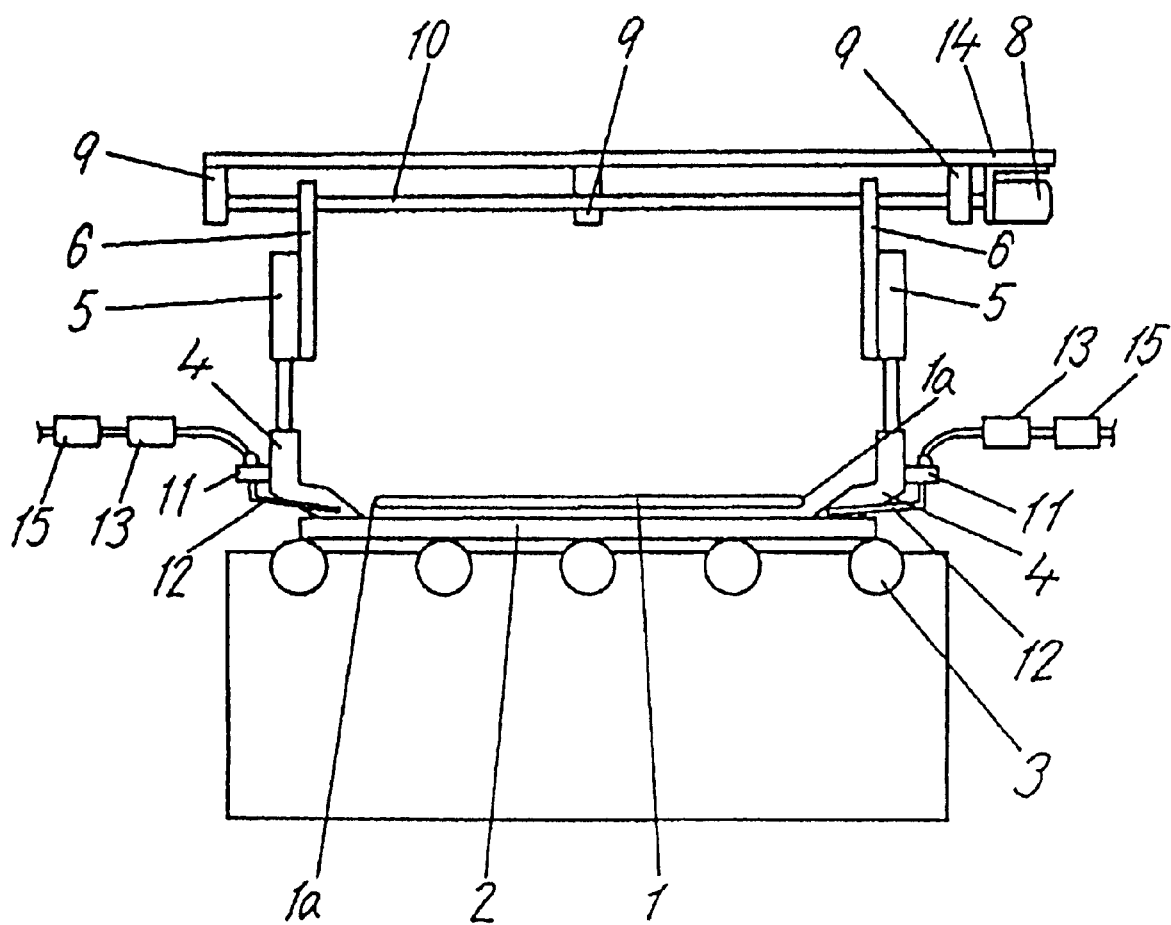
FIG. 7 is a front view of an apparatus for taking away a plate in a state in which a plate floats when gas is injected to the plate.
Figure 8:
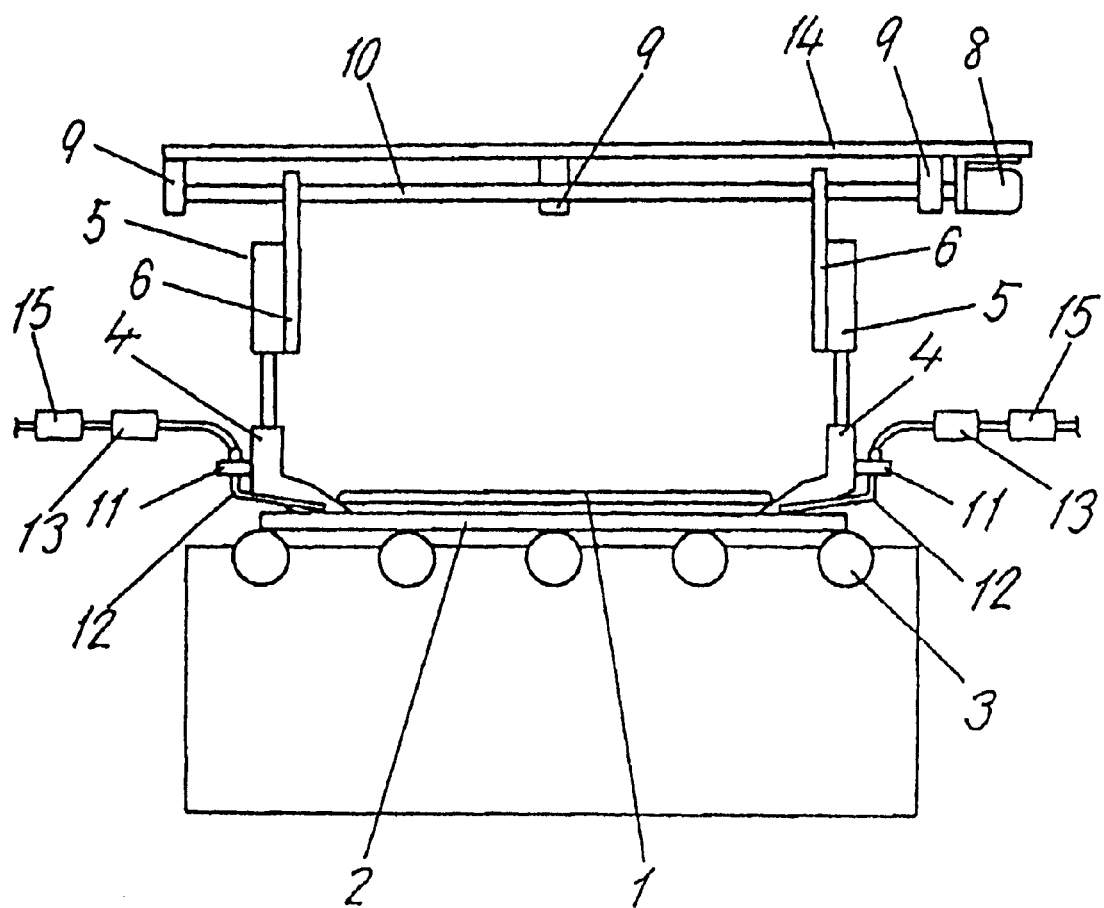
FIG. 8 is a front view showing a state in which scooping blocks are inserted under a floating plate.

As shown in FIG. 1, the plate 1 is placed substantially in the center on the support plate 2. The scooping blocks 4 abut on the support plate 2 in the vicinity of the outer peripheral edges 1a of the plate 1 as shown in FIG. 8. In this state, a gas is injected from the gas injection means 11. The injected gas hits the outer peripheral edge 1a of the plate 1 as indicated by an arrow 17 in FIG. 5, thereby the gas enters under the lower surface of the plate 1, and produces a buoyancy on the plate 1. Therefore, as shown in FIG. 6, the plate 1 floats about 1 to 2 mm upward from the top surface of the support plate 2. The state at this time is shown in FIG. 7, including the apparatus for taking away plate. If the size of the plate 1 is small, the weight thereof is light, so that the whole of the plate 1 floats. If the size of the plate 1 is large, only the outer peripheral edges 1a of the plate 1 float in such a manner that the plate is deflected.

When the drive motor 8 is rotated at the same time the gas is injected by the gas injection means 11, and thereby the bracket 6 is moved, the tip end of the scooping block 4 enters under the lower side of the floating plate 1 as shown in FIG. 8. In order for the tip end of the scooping block 4 to easily insert under the lower side of the plate 1, the outer peripheral edge 1a of the plate 1 preferably has a curved cross-sectional shape which is convex toward the outside as shown in FIG. 5 or FIG. 6. In this case, a buoyancy can be produced at the edge of the plate 1 by the pressure of gas entering under the convexly curved surface. By stopping the gas injection when the gas enters to some extent, the gas injection time can be made short, so that a phenomenon that the plate 1 is bounced by the injected gas is prevented.

Figure 9:
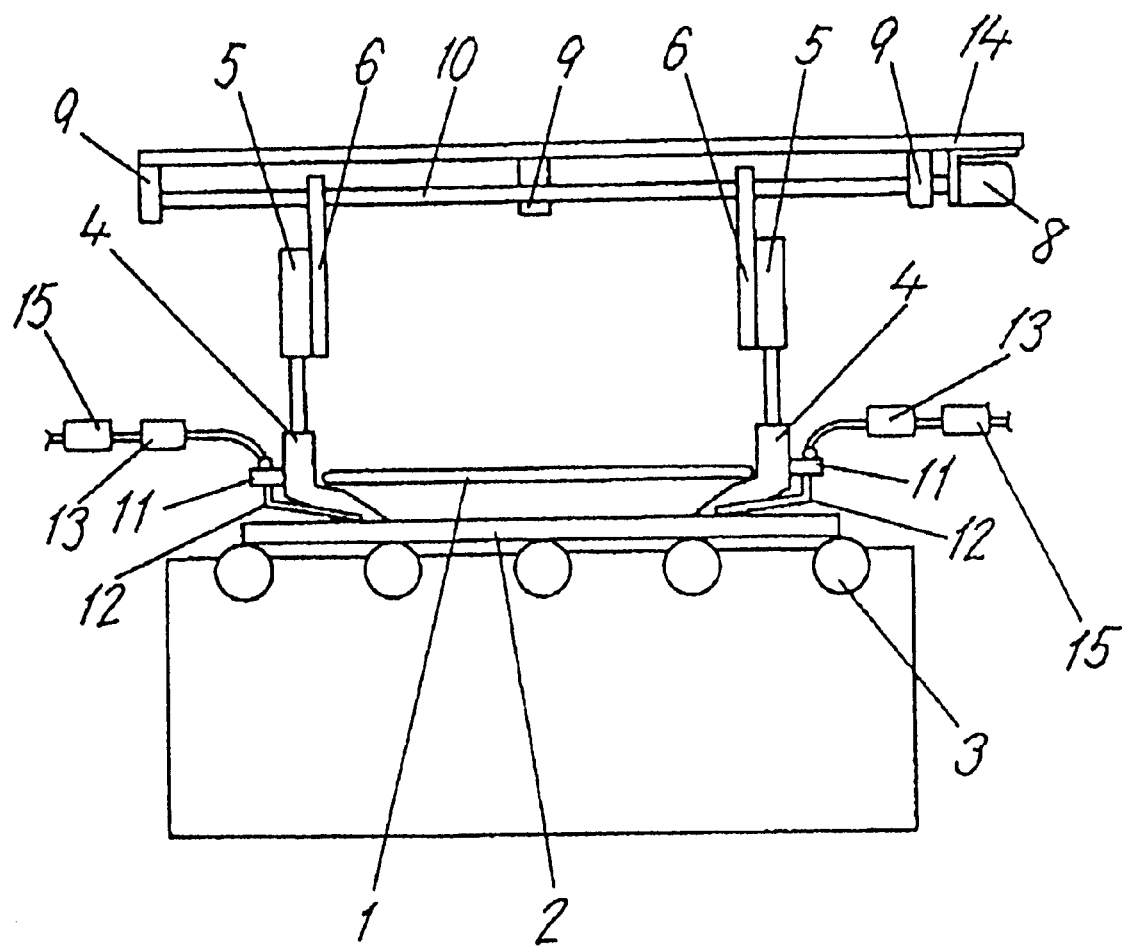
FIG. 9 is a front view showing a state in which a plate is held between scooping blocks.
Figure 10:
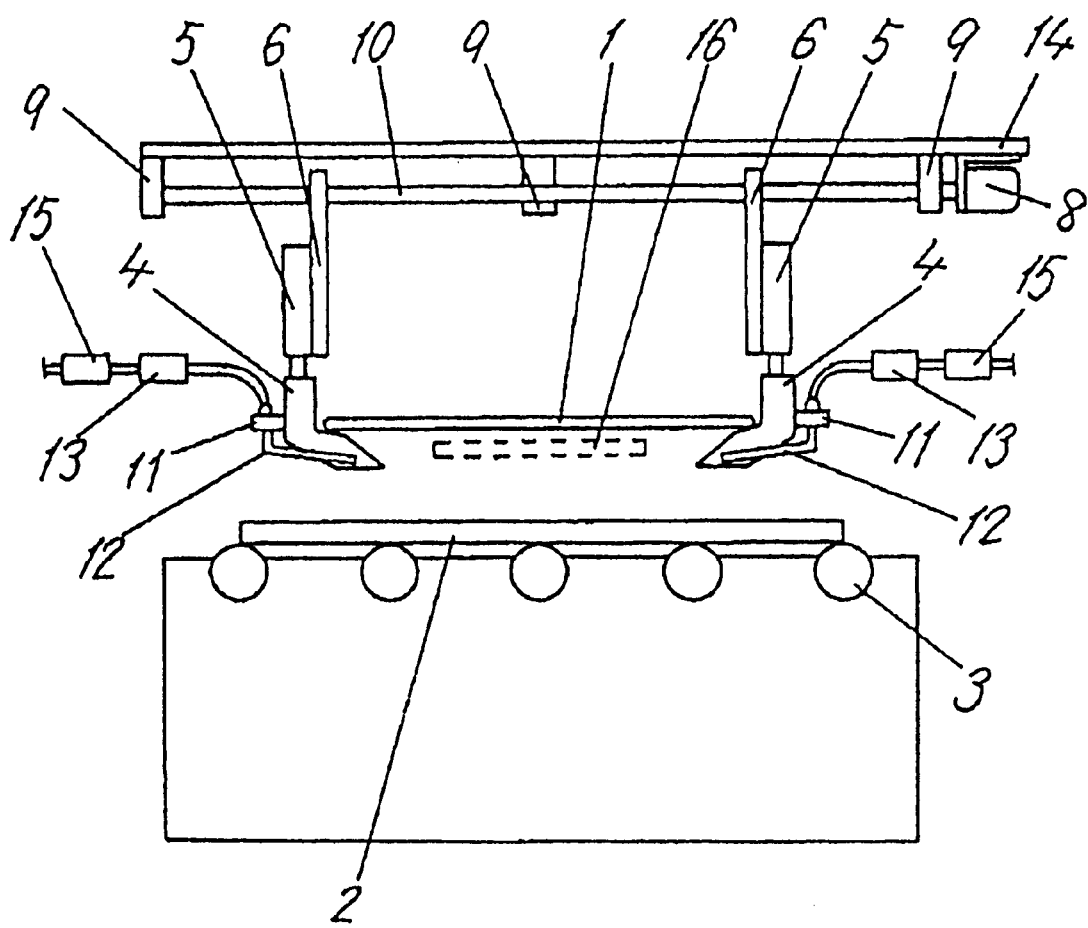
FIG. 10 is a front view showing a state in which scooping blocks holding a plate are moved upward.

When the drive motor 8 is further rotated from the state shown in FIG. 8, the plate 1 moves upward by a component force for pushing up the plate 1 upward while sliding on the slope of the scooping block 4. As a result, as shown in FIG. 9, the plate 1 is held between the opposed scooping blocks 4. When this state is reached, the rotation of the drive motor 8 is stopped. Next, the air cylinder 5 is operated to move the scooping block 4 upward, and thereby the plate 1 is removed completely from the support plate 2 as shown in FIG. 10. After this state is reached, an arm 16 of a robot (not shown) is moved to under the plate 1 and moved upward to place the plate 1 on the arm 16, by which the plate 1 can be transferred from the apparatus for taking away the plate to the robot.

Figure 11:
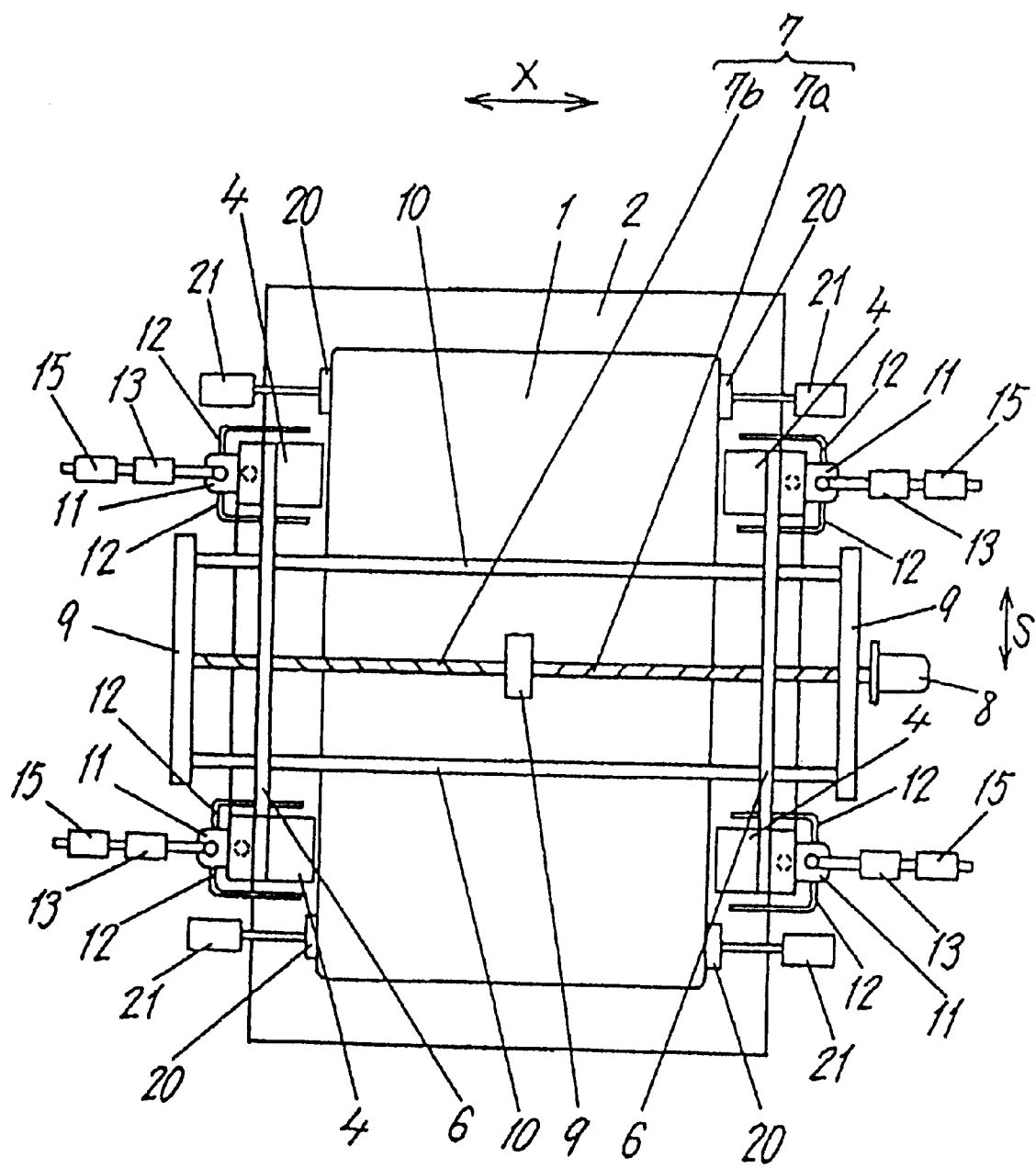
FIG. 11 is a plan view showing another embodiment of an apparatus for taking away a plate in accordance with the present invention, in which an installation plate is omitted.
Figure 12:
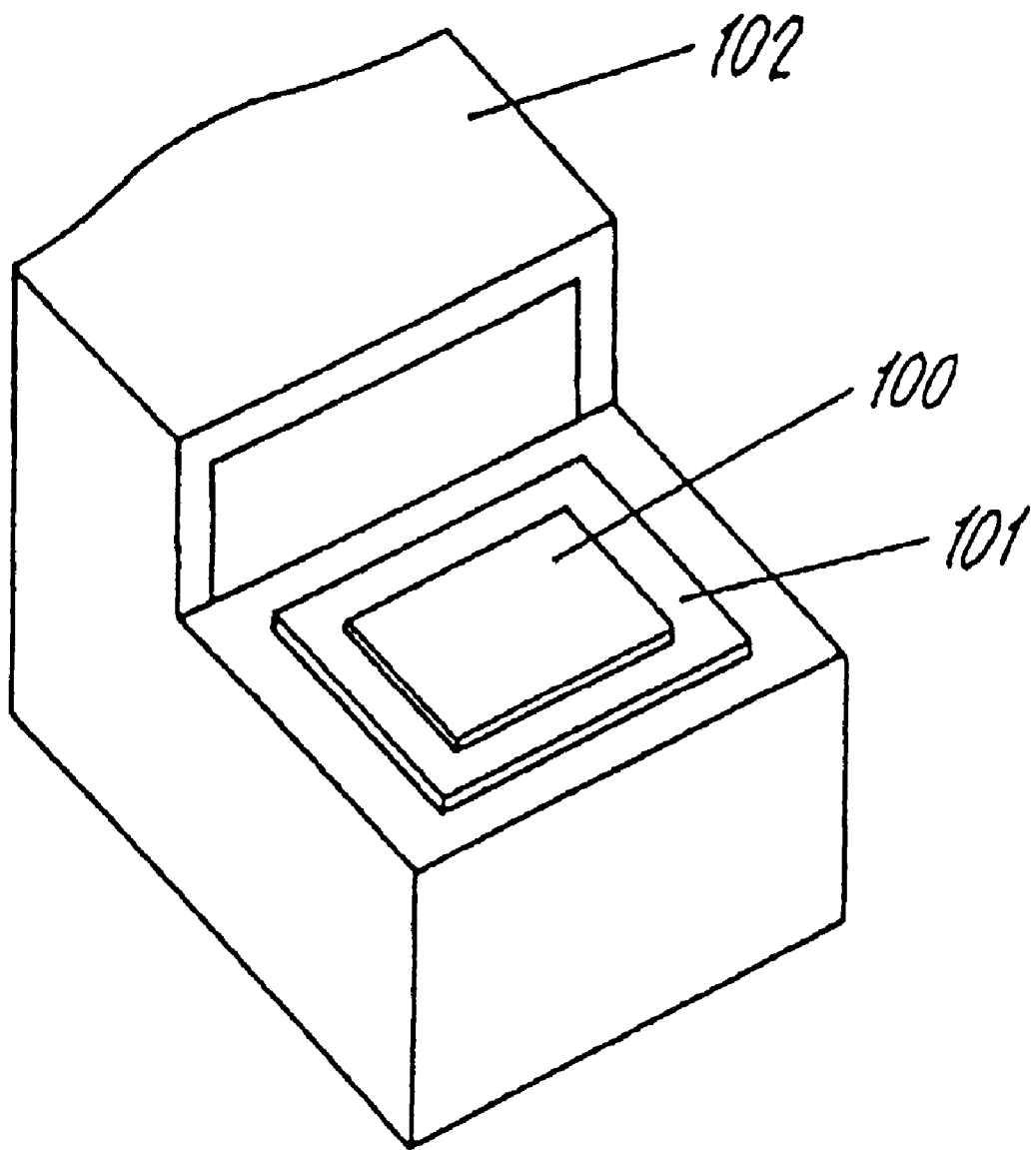
FIG. 12 is a perspective view showing a state in which a plate is discharged from a firing furnace.

Next, another embodiment will be described with reference to FIG. 11. In FIG. 11, the same reference numerals are applied to the same elements as those in the above embodiment, and the description thereof is omitted. A block 20, which is position regulating means for the plate 1, is formed of a plastic material with a low coefficient of friction. The block 20 is fixed to an air cylinder 21, and disposed at four places at the outer peripheral edges 1a of the plate 1. Although four blocks 20 are disposed in the embodiment shown in FIG. 11, two blocks 20 may be disposed at the right and left side in the center in the S direction of the plate 1. After the scooping block 4 enters under the lower side of the floated plate 1 as shown in FIG. 8, the block 20 is brought close to the plate 20 by operating the air cylinder 21 as shown in FIG. 11 to hold the plate 1. From this state, the plate 1 is moved upward and removed. Thereby, when the plate 1 is floated, a phenomenon that the plate 1 vibrates in the direction of arrow X or bounces can be prevented, so that the stability of the plate removing operation can be improved.

As described above, the apparatus for taking away the plate in accordance with the present invention has support means for placing the plate, plate scooping means, and gas injection means which is moved together with the plate scooping means by driving means. Therefore, there is no need for forming a hole in the support means, so that stains are not produced on the plate during firing. Also, since the plate is not touched by hand when the plate is removed, a flaw is not produced on the plate, and the plate can be removed stably. Also, by providing the position regulating means for the plate, the bounce of plate when the plate is floated is eliminated, so that the plate can be removed stably. Further, the removal of plate using a continuous firing furnace can be automated.

Also, in the method for taking away plate in accordance with the present invention, the edges of the plate are floated from the support plate by injecting gas to the plate edges and the tip end of the plate scooping means is inserted under the floated plate to move upward, so that the plate can be stably removed without producing a flaw on the plate.

What is claimed is:

1. An apparatus for removing a plate comprising:
   support means for holding a plate:
   gas injection means for floating an edge of said plate above said support means by injecting gas under an edge of said plate;
   plate scooping means for scooping said plate by inserting a tip end thereof under the floated edge of said plate; and drive means for removing said floated plate from said support means by moving said plate scooping means.

2. An apparatus for removing a plate according to claim 1, wherein a tip end of the gas injection means is disposed in a vicinity of an outer peripheral edge of a plate.

3. An apparatus for removing a plate according to claim 1, wherein the gas injection means is connected to a gas passage provided inside the plate scooping means.

4. An apparatus for removing a plate according to claim 1, further comprising:
   a pressure regulating means provided to regulate the pressure of said gas.

5. An apparatus for removing a plate according to claim 1, wherein the tip end of the plate scooping means has a wedge shape.

6. An apparatus for removing a plate according to claim 1 further comprising:
   a regulating means provided to support and regulate an edge of a plate that the plate scooping means abuts.

7. A method for removing a plate comprising:
   floating an edge of a plate above a support means by injecting gas from a gas injection means under the edge of said plate;
   supporting the floated edge of said plate by a tip end of a plate scooping means; and
   removing said plate from said support means by moving said plate scooping means.

8. A method for removing a plate, as in claim 7, further comprising:
   sliding said plate upward along a slope of the tip end of said plate scooping means by moving said plate scooping means to hold said plate; and
   removing said plate from said support means by moving said plate scooping means upward.

9. A method for removing a plate as defined in claim 7, further comprising:
   sliding said plate upward along a slope of the tip end of said plate scooping means by moving said plate scooping means to hold said plate;
   supporting the edge of said plate on which said plate scooping means abuts by a regulating means; and
   removing said plate from said support means by moving said plate scooping means upward.

10. A method for removing a plate according to claim 7, wherein an outer peripheral edge of a plate is formed into a curved face having a convex-shaped vertical section taken perpendicularly to said edge, and the plate scooping means is opposed to the outer peripheral edge of such plate.

* * * * *